(12) United States Patent
Kummamuru et al.

(10) Patent No.: US 7,219,105 B2
(45) Date of Patent: May 15, 2007

(54) METHOD, SYSTEM AND COMPUTER PROGRAM PRODUCT FOR PROFILING ENTITIES

(75) Inventors: Krishna Kummamuru, New Delhi (IN); Raghuram Krishnapuram, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 10/664,261

(22) Filed: Sep. 17, 2003

(65) Prior Publication Data

US 2005/0060170 A1    Mar. 17, 2005

(51) Int. Cl.
*G06F 7/00* (2006.01)
*G06F 17/30* (2006.01)
*G06F 15/00* (2006.01)
*G06F 17/00* (2006.01)

(52) U.S. Cl. ............... 707/102; 707/106; 707/3; 707/4; 707/5; 707/6; 715/514; 715/531; 715/532

(58) Field of Classification Search ........... 707/3–6, 707/100, 102, 106; 715/514, 531, 532
See application file for complete search history.

(56) References Cited

U.S. PATENT DOCUMENTS 6,897,866 B1 * 5/2005 Hetzler et al. .............. 345/440

2001/0013029 A1   8/2001   Gilmour
2002/0024532 A1   2/2002   Fables et al.

OTHER PUBLICATIONS

Xu et al., ACM Transactions on Information Systems, vol. 18, No. 1, Jan. 2000, pp. 79-112.*
Liu et al., CIKM'02, Nov. 4-9, 2002, McLean, Virginia, USA, pp. 558-565.*
Pretschner et al., Ontology based personalized search, ICTAI, 1999, pp. 391-398.*
Vossen P., Proceedings of the NAAPL 2001 Workshop, on worldnet and other lexical resources, Pittsburgh, June, pp. 1-7.*
Hetzler et al., Proceedings of the Fifth International Visualization '98, pp. 137-145, Research Triangle Park, North Carolina, Oct. 19-20, IEEE CS Press.*

\* cited by examiner

*Primary Examiner*—Tim Vo
*Assistant Examiner*—Cheyne D. Ly
(74) *Attorney, Agent, or Firm*—Gibb I.P. Law Firm, LLC; T. Rao Coca, Esq.

(57) ABSTRACT

The present invention provides a method, system and computer program product for profiling an entity based on information obtained form at least one information source. Various contexts associated with the entity are identified. This can be achieved by using a clustering algorithm, an ontology, a thesaurus, association rules or manually by an expert. After the classified into various sets and ranked using a ranking algorithm. Thereafter, certain top ranked concepts are presented to a user as the profile of the entity.

12 Claims, 7 Drawing Sheets

METHOD, SYSTEM AND COMPUTER PROGRAM PRODUCT FOR PROFILING ENTITIES

FIELD OF THE INVENTION

The present invention relates to the field of entity profiling. More specifically, the invention relates to a method, system and computer program product for automatically profiling an entity based on information obtained from at least one information source.

BACKGROUND

The last decade has witnessed a huge surge in the amount of electronic data available. The growth in the Internet and conversion of traditional paper based documents into electronic formats has led to a vast amount of information being available on the World Wide Web and enterprise information sources. Extraction of useful information from the large amount of accessible data is a challenge for researchers.

Several search engines exist that facilitate searching of information from different information sources. For example, search engine Google™ is a commonly used search engine for obtaining information over the World Wide Web. When a user is looking for some specific document from the information sources, then he/she can use a combination of relevant keywords to obtain the desired result. Several techniques exist which optimize the search process to present the most relevant documents to the user. However, if a user is looking for some generic information on a particular entity, then he/she needs to browse through all the documents obtained as a result of a search conducted using the entity as the search query. Thereafter, the user can create a profile of the entity by browsing through the obtained results. For example, in order to create a profile for IBM® (® trademark of IBM Corporation in the U.S.A. or other countries or both), a user would give IBM as the search query. This search query will return a large number of documents from the information sources. These documents may relate to different aspects of the entity 'IBM'. For example, they may relate to the products, services, employees, competitors, and the like of IBM. Also, there may not be a website, or an information source dedicated to 'IBM' that lists the various connotations of 'IBM'. Profiling the entity 'IBM' would imply summarizing the various aspects of 'IBM' such as products, services, competitors and the like of 'IBM'. In order to do this, the user will have to browse through each search result. This can be a very tedious task.

For example, the entity 'IBM' returned a total of 22,700,000 results when searched over the Internet through the search engine Google™. It is almost impossible for a user to read all these documents and profile the entity IBM. Moreover, it is very difficult for the user to structure the relevant documents in a manner that summarizes the various aspects of the entity 'IBM'.

Certain patents exist that facilitate profiling of entities. Some of them are mentioned hereinafter.

US Patent Application Publication No. 2002/0024532, titled "Dynamic personalization method of creating personalized user profiles for searching a database of information", discloses a method of profiling an entity. However, this method presents an index of choices representing content items stored in the information source, to the user. Each displayed choice of the index is associated with a set of related keywords representing categories for the content items stored in the information source. Hence, this method is not suitable for searching in non-indexed information sources.

US Patent Application Publication No. 2001/0013029, titled "Method of constructing and displaying an entity profile constructed utilizing input from entities other than the owner", discloses a method of constructing a profile of users or clients or entities based on the electronic documents between two entities. However, in this method, the electronic documents need to be exchanged for the construction of the profile.

Therefore, in light of the drawbacks associated with the existing art, there is a need for a method and system for summarizing the various aspects of an entity automatically. Further there is a need for a method and system for constructing a profile of an entity, based on the information obtained from at least one information source.

SUMMARY

An object of the current invention is to provide a method, system and computer program product for constructing a profile for an entity, based on information obtained from at least one information source.

Another object of the current invention is to identify the relevant features of an entity and present them to the user in a structured manner.

A further object of the current invention is to provide a system for automatically summarizing various aspects of an entity.

The current invention provides a method and system for profiling an entity based on information obtained from at least one information source. Various contexts associated with the entity are identified. This can be achieved by using a clustering algorithm, an ontology, a thesaurus, association rules or manually by an expert. After the identification of contexts, various concepts within each context are identified. The concepts can be identified using any feature selection technique. Once the concepts have been identified, distinct entity-context pairs are identified and the identified concepts are classified into various sets with respect to each entity-context pair. Thereafter, the concepts within each entity-context pair are ranked using a ranking algorithm. Few top ranked concepts from each set are then presented to the user.

In an embodiment of the current invention, the entity is used as a search query to obtain information from at least one information source. The retrieved information is used to identify the various contexts related to the entity. Thereafter, further information is retrieved from at least one information source using the contexts to form the further search query. This further information is used to identify concepts relating to the contexts.

BRIEF DESCRIPTION OF THE DRAWINGS

The preferred embodiments of the invention will hereinafter be described in conjunction with the appended drawings, provided to illustrate and not to limit the invention and in which like designations denote like elements.

DESCRIPTION OF PREFERRED EMBODIMENTS

Figure 1:
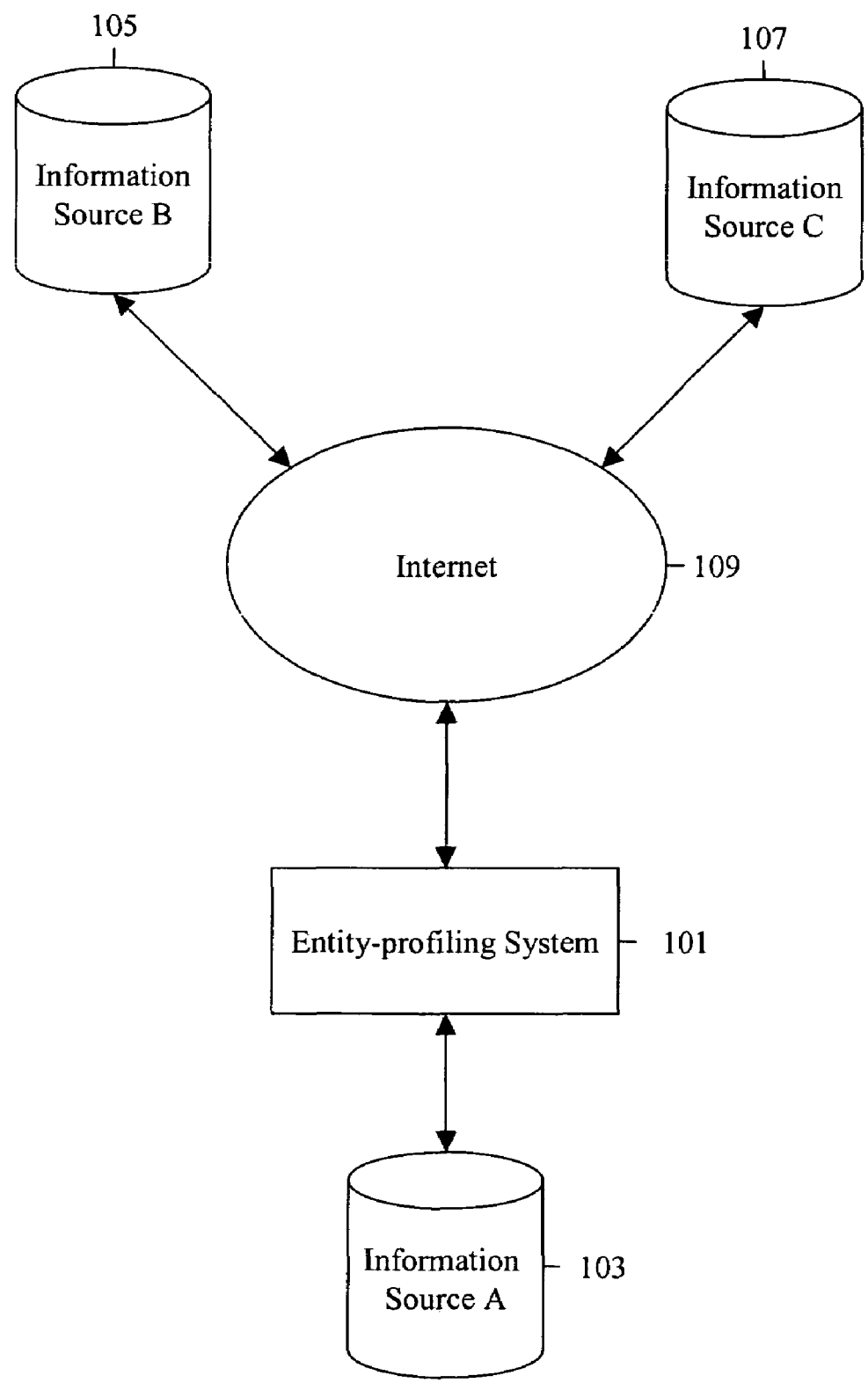
FIG. 1 shows a block diagram illustrating the environment for the working of the present invention.

For convenience, appropriate explanations of a number of terms used in the description of preferred embodiments are given below. It is to be understood that these explanations are given merely to aid better understanding of the description, and that they are not to be considered as limiting the scope of the invention claimed.

Definitions

Entity: An entity may be a simple word or a phrase. It may refer to an organization, a person, a sport, religion etc. Various examples of the entity can be IBM, James Bond, Football etc.

Profile: The summarization of various features of an entity is called its profile. For example, if the entity is "IBM", then the summarization of its products, services, employees, and competitors may be referred to as the profile of 'IBM'.

Contexts: Contexts referred to in the present invention may have varied interpretations. The context may be a discourse that surrounds a language unit and helps to determine its interpretation. For example, the context for 'switch' may be "electrical goods". Contexts may also mean various aspects associated with an entity. For example, some of the contexts associated with breast cancer could be causes, preventive medicine, exercises, genes causing the cancer, and drugs. Contexts could also mean various interpretations of a word or a phrase. For example, the word "bond" may mean James Bond, a government bond, a chemical bond, etc. These contexts can be flat or hierarchical, unique or entity dependent. An example of hierarchical contexts can be given for an entity "Boeing". In case of "Boeing", the context "automation" may have "software" and "hardware" as sub-contexts.

Profiling of an entity is more meaningful and useful if the identified contexts are orthogonal. Two or more contexts are said to be orthogonal if the associated key words or phrases are non-overlapping. In this definition, it is assumed that the keywords associated with the contexts do not have multiple senses. In general, a pair of contexts can be considered orthogonal even if they share a set of common keywords, provided the keywords are used in different senses in the two contexts.

However, there are several issues relating to orthogonal contexts. Seemingly orthogonal contexts like "software" and "hardware" may have some common keywords, which makes them non-orthogonal according to the above definition of orthogonality. Moreover, the concept of orthogonality could depend on the entity to be analyzed as well. For example, the contexts "software" and "hardware" may appear to be orthogonal with respect to the entity "IBM". However, they may form part of the context "automation" with respect to the entity "Boeing".

In practice, it may not be possible to find a meaningful set of contexts that are orthogonal for any given entity. Therefore, the phrase orthogonal contexts may be used somewhat loosely, in the sense that the contexts need not satisfy the orthogonality condition defined above. Therefore, in the description of the invention, contexts would imply various features of the entity that the user is interested in analyzing.

Concepts: Concepts are terms or phrases that give information about the contents of the documents. They signify the various aspects or features covered in the documents. In other words, the contexts capture the essence of the documents at a broad level while the concepts summarize the documents in more detail. For example, consider the case of a user who has a collection of documents with respect to a context "bag", with the documents providing information about hand bags and shoulder bags. Therefore, the concepts with respect to the context "bag" are "handbag" and "shoulder bag".

The present invention describes a method, system and computer program product for profiling an entity based on information obtained from one or more information sources. These information sources can be enterprise databases, or other information sources that can be accessed over a network. Contexts are identified for a given entity based on the information obtained from at least one information source. Thereafter, concepts within each context are identified. These concepts are presented to the user in a structured manner, thereby profiling the entity.

FIG. 1 shows a block diagram illustrating the environment for the working of the present invention. Entity profiling system 101 is used to profile entities based on information obtained from several information sources. Entity profiling system 101 can access information sources directly, as in case of enterprise information sources, or it can access information sources through the Internet 109. As shown in FIG. 1, entity-profiling system 101 has direct access to information source 103 while information sources 105 and 107 are accessed through the Internet 109.

Figure 2:
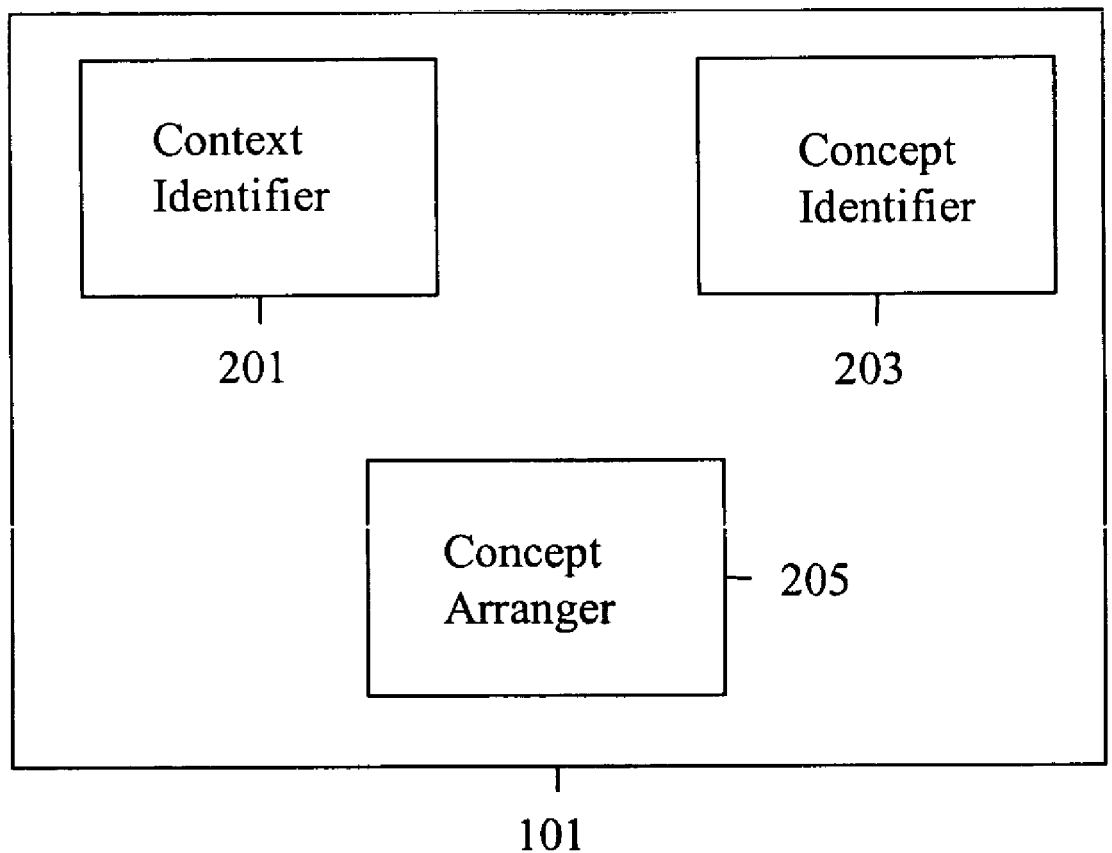
FIG. 2 shows a block diagram illustrating the various components of entity-profiling system in accordance with a preferred embodiment of the present invention.

FIG. 2 shows a block diagram illustrating the various components of entity-profiling system 101. It comprises a context identifier 201, a concept identifier 203 and a concept arranger 205. Context identifier 201 takes as input an entity and identifies all possible contexts relevant to the entity. Details on the exact manner in which contexts are identified have been explained in detail in conjunction with FIG. 3. Concept identifier 203 takes as input the contexts identified by context identifier 201 and identifies concepts corresponding to each context. Details on how the concepts are identified will be explained in detail in conjunction with FIG. 3. The identified concepts within each context are structured and presented by concept arranger 205. Details on the manner in which the concepts are structured in order to present a profile of the entity will be explained in conjunction with FIG. 4.

Figure 3:
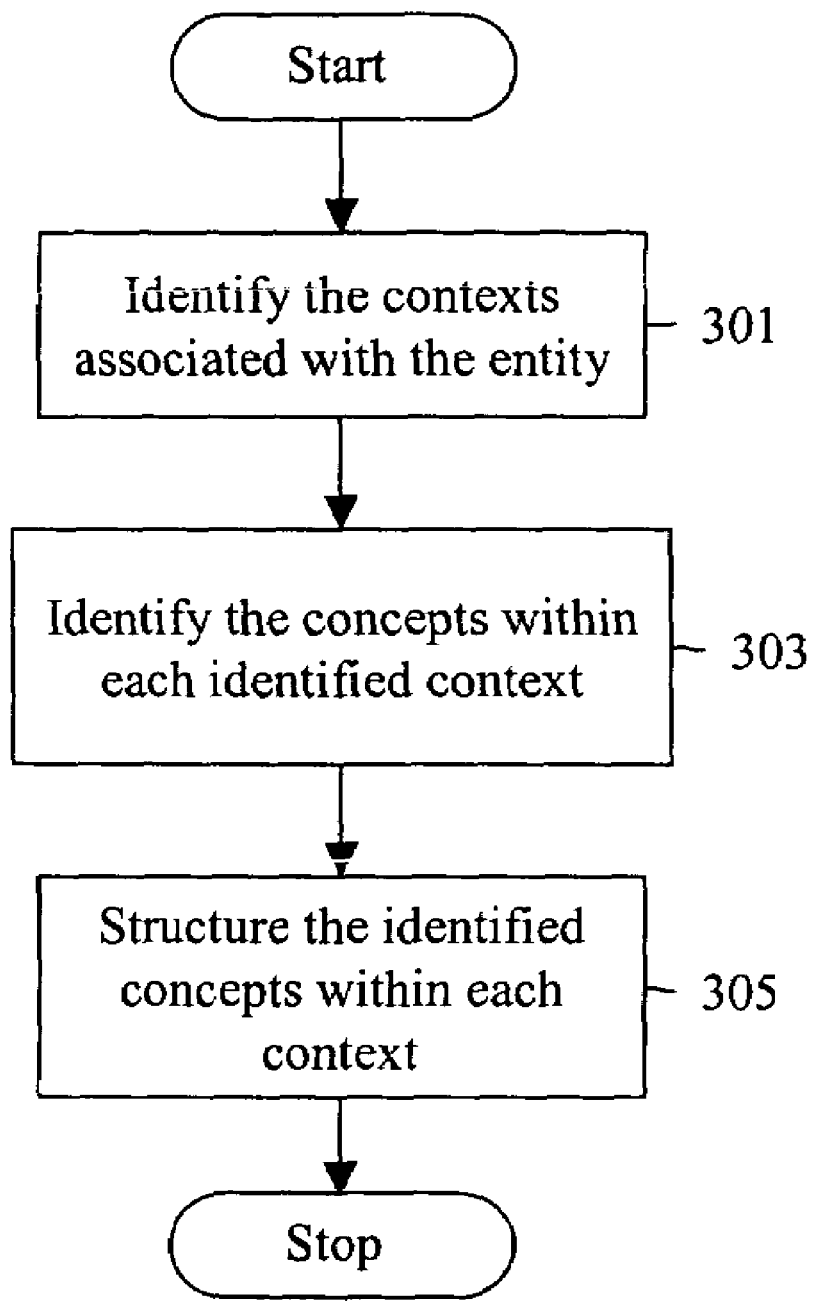
FIG. 3 is a flowchart illustrating the method of profiling an entity in accordance with a preferred embodiment of the current invention.

FIG. 3 shows a flowchart depicting the method of profiling an entity in accordance with the system illustrated in FIG. 2. As shown in FIG. 3, various contexts with respect to the entity are identified at step 301. There are various methods for identifying the contexts. One such approach is through the use of a clustering algorithm. In this approach, the user first retrieves information related to the entity from the information sources. The information may be in the form of documents. The user retrieves the documents by giving entity as a search query to a search engine. Thereafter, a clustering algorithm is applied to cluster the retrieved documents. The resulting clusters can be considered to correspond to various contexts associated with the entity. Various clustering algorithms known in the art may be used for clustering the retrieved documents. Certain clustering algorithms that can be used in the current invention have been mentioned in the following literature: (1) Marti A. Hearst and Jan O. Pedersen, "Reexamining the cluster hypothesis: Scatter/gather on retrieval results," in Proceedings of SIGIR-96, 19th ACM International Conference on Research and Development in Information Retrieval, Zurich, CH, 1996, pp. 76–84; (2) Oren Zamir and Oren Etzioni, "Grouper: a dynamic clustering interface to Web search results," Computer Networks (Amsterdam, Netherlands: 1999), vol. 31, no. 11–16, pp. 1361–1374, 1999, and (3) Krishna Kummamuru and Raghu Krishnapuram, "A clustering algorithm for asymmetrically related data with applications to text mining," in Proceedings of ACM 10th International Conf. on Information and Knowledge Management (CIKM), Atlanta, 2001, pp. 571–573. It must be apparent to one skilled in the art that although certain clustering algorithms have been specified for use in the current invention, any other clustering algorithm can also be used without deviating from the scope of the current invention.

One may also use an ontology or a taxonomy for the identification of contexts. The ontology is a controlled, hierarchical vocabulary for describing a knowledge system. For example, contexts can be defined using either Dmoz directory or Yahoo! directory. The contexts can be identified by finding prominent nodes that contain the entity, in the ontology. The prominent nodes are the ones that contain the entity quite frequently. Alternatively, a thesaurus may also be used to identify the contexts associated with the entity. One may use synonyms, hypernyms, hyponyms, meronyms or similar word relationships for the identification of contexts. For example, if the entity to be profiled is "bond", then the possible contexts identified by thesaurus are "affiliation" and "guaranty", as these are synonyms for "bond". There are other approaches as well that use association rules to find distinct contexts associated with the entity. For example, one may find a set of the words or phrases that occur frequently with the entity and that mutually do not appear together in documents in the information source. Another approach that uses association rules has been cited in: Amit Nanavati, Krishna Prasad Chitrapura, Sachindra Joshi, and Raghu Krishnapuram, "Mining generalized disjunctive association rules," in Proceedings of ACM 10th International Conf. on Information and Knowledge Management (CIKM), Atlanta, 2001, pp. 482–489.

In an alternative embodiment of the current invention, the contexts can be identified manually by an expert. In such as case, the user simply inputs all contexts that are relevant to entity in question. Although certain methods have been specified for identifying contexts associated with an entity, it must be apparent to one skilled in the art that any other method can be used without deviating from the scope of the invention.

After the identification of contexts, various concepts within each context arc identified at step 303.

Contexts can be represented either by a set of terms (which can be keywords or phrases) or by a set of documents. The set of terms can also be considered as a single document. Therefore, since set of documents is a more general representation, they can be used to represent a context. Hence, for a given entity-context pair, there are two sets of documents—one related to the entity to be profiled and the other related to the corresponding context. These sets of documents are used to identify concepts for each entity-context pair.

The concepts can be identified by following a two-step approach. These two steps are performed for each entity context pair. In the first step, the documents relating to the entity and each context are retrieved from the information sources. In case documents relating to the entity have already been retrieved (as in the case of identifying contexts by using a clustering algorithm), then only documents relating to each context are retrieved. The user can retrieve the documents by giving the entity and the context as queries to the search engine. The search engine returns two sets of documents. One set of documents is related to the entity and the other set of documents to the context. Alternatively, the user may perform search for the entity only once and use the set of retrieved documents for other entity context pairs. The concepts are identified from these sets of documents by using any of the text parsing algorithms that extract meaningful words or phrases in the document collections. For example, one can use Link grammar parser as described in: Daniel Sleator and Davy Temperley, Parsing English with a Link Grammar, Third International Workshop on Parsing Technologies, August 1993. The words or phrases extracted by these parsers can be used as the concepts.

Once the concepts are identified, they are structured and presented to the user as shown at step 305.

Figure 4:
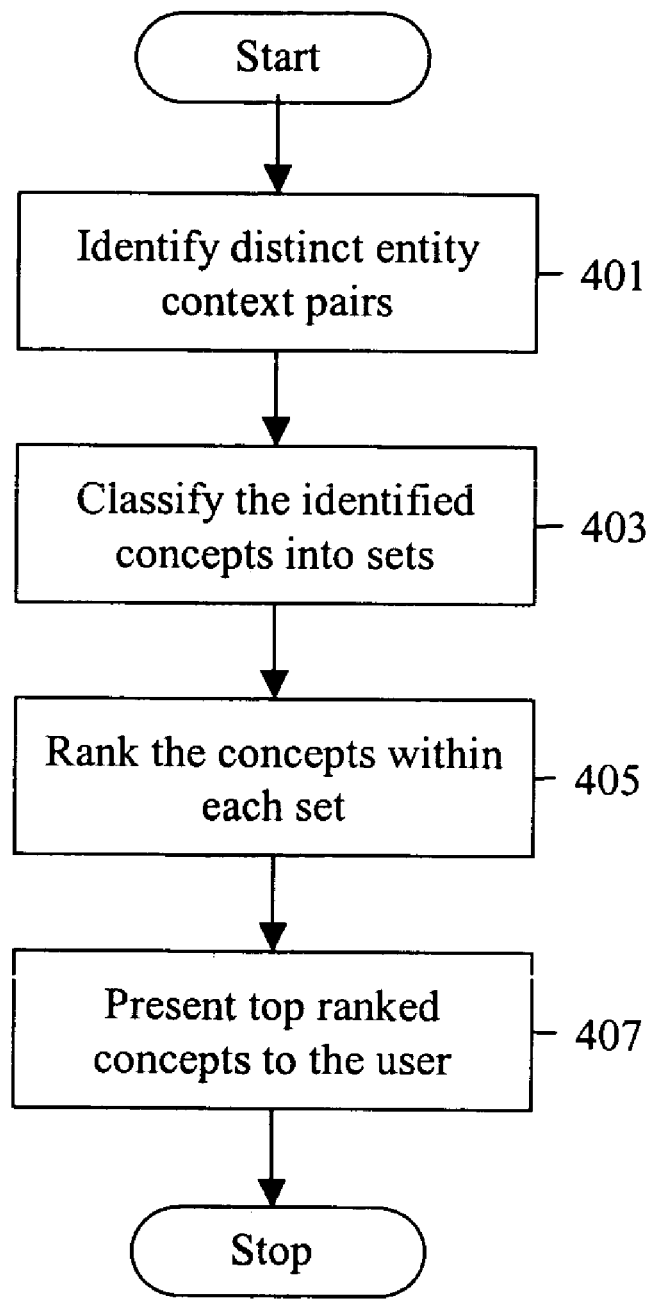
FIG. 4 is a flowchart describing the method of structuring and presenting the concepts to the user in accordance with a preferred embodiment of the current invention.

FIG. 4 illustrates a flowchart describing the method of structuring and presenting the concepts. The first step is to identify distinct entity context pairs as shown at step 401. After the identification of distinct entity context pairs, each entity context pair is taken and the identified concepts, which are a combination of concepts for the entity and the corresponding context, are classified into four sets as shown at step 403. The first set of concepts contains concepts that are exclusive to E and is denoted by E(C'). Here E refers to the entity and C refers to the context. The second set comprises of concepts that are exclusive to C and is denoted by C(E'). The third set denotes concepts that are common to E and C but more representative of E, denoted by E(C) and the fourth set comprises of concepts that are common to E and C but more representative of C, denoted by C(E).

Subsequently, the concepts within each of these sets are ranked at step 405. Several feature selection techniques used in text classification can be adapted to rank the concepts. Some of the derived ranking algorithms will be explained in detail later. The classification of concepts into the four sets has also been described in detail in conjunction with ranking algorithms later. Once the concepts have been ranked, few top ranked concepts within each set are presented to the user at step 407. The number of concepts to be presented can be chosen by the user. For example, the user may choose to present only the top ten concepts or a certain percentage of the total number of concepts retrieved.

Having explained the general idea, the invention will hereinafter be explained with the help of an example. It must be apparent to one skilled in the art that the entity 'IBM' has been taken for illustrative purposes only and the various contexts and concepts shown to be associated with this entity are merely of exemplary nature.

Figure 5:
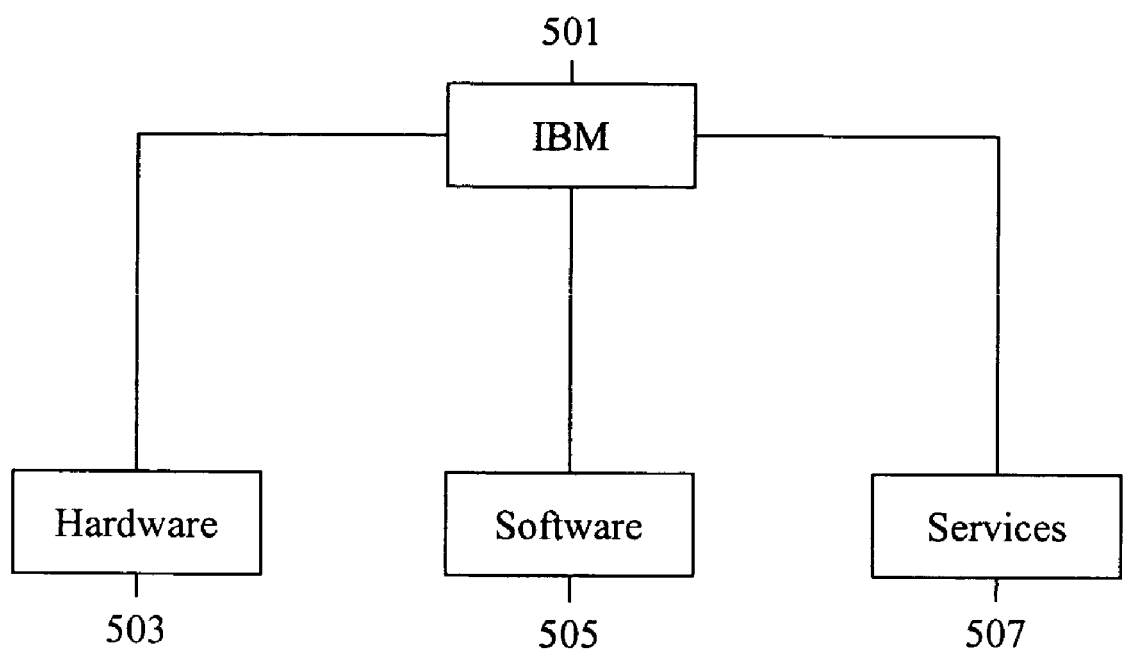
FIG. 5 shows the principal contexts for an entity 'IBM'.

FIG. 5 shows the principal contexts for the entity 'IBM'. The contexts for IBM 501 may be Hardware 503, Software 505 and Services 507. Within hardware 503, the concepts can be classified into four sets E(C'), E(C), C(E') and C(E). It must be apparent to one skilled in the art that the contexts shown in FIG. 5 are for exemplary purposes only and the contexts relating to the entity 'IBM' may not be limited to hardware, software and services only.

Figure 6:
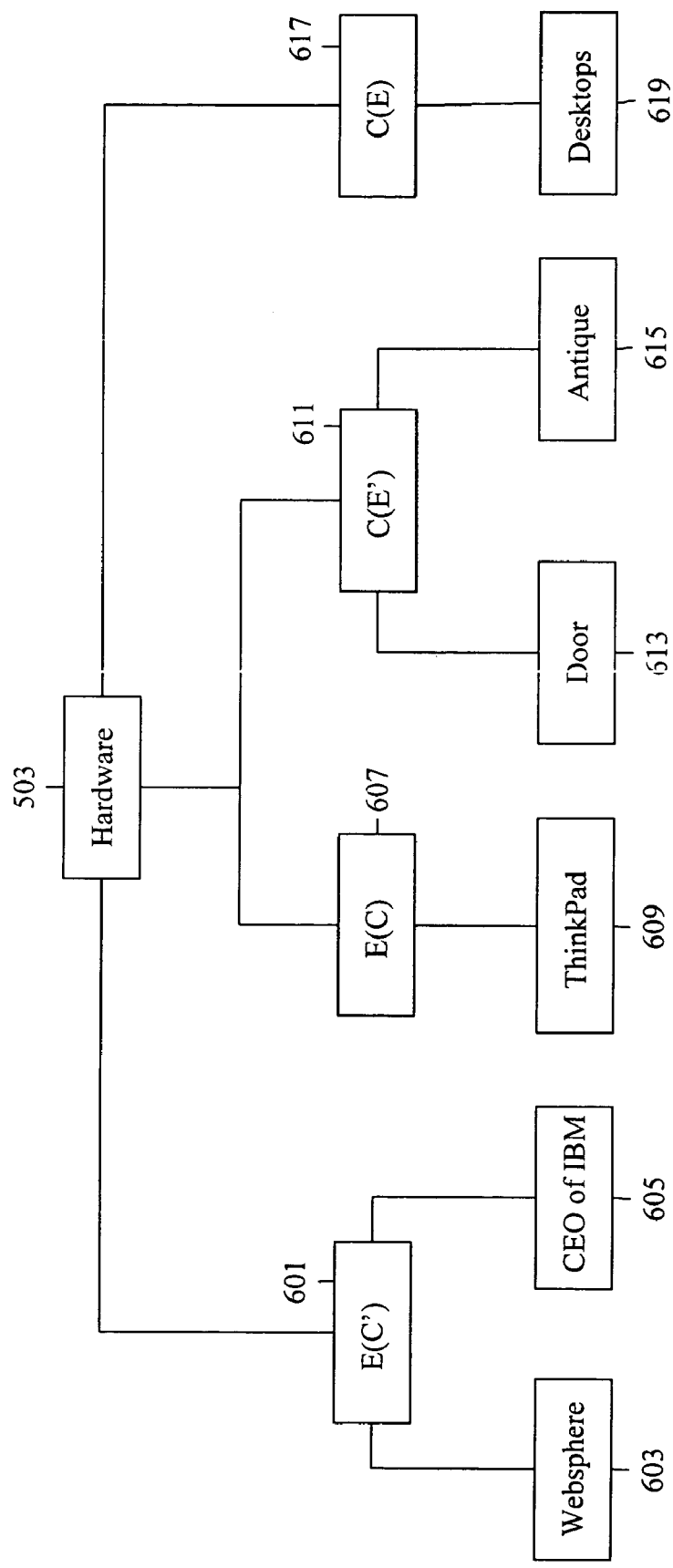
FIG. 6 shows a few top ranked concepts within the hardware context of the entity 'IBM'.

FIG. 6 shows a few top ranked concepts within the hardware context of the entity 'IBM'. Set E(C') 601 comprises concepts namely Websphere 603 and CEO of IBM 605. These two concepts are associated with IBM 501 in contexts other than hardware 503. One of the concepts in E(C) 607 is ThinkPad 609. This concept is common to both IBM 501 and hardware 503 but it is more representative of IBM 501 than hardware 503, since 'IBM ThinkPad' is a popular laptop by IBM. Set C(E') 611 contains concepts such as door 613 and antique 615. These concepts are associated with hardware 503 in contexts other than IBM 501. Similarly, set C(E) 617 contains concepts like desktops 619. This concept is common to both IBM 501 and hardware 503. However, desktops 619 are more representative of hardware 503 than IBM 501.

Ranking Algorithms

Certain ranking algorithms will hereinafter be described. The notation used in describing the algorithms is common for all these algorithms. Let N denote the set of documents related to the entity and M the set of documents related to the context associated with the entity. Let G and H be the sets of concepts identified from the sets of documents N and M respectively. Let $R_{E|C}(t)$ be the rank of a term t in N in the context of C according to a ranking algorithm. Let $R_{C|E}(t)$ be defined similarly. Then, E(C') contains the few top-ranked concepts from the set (G-H) (the concepts that are present in G but not in H) ranked according to $R_{E|C}(t)$, C(E') contains the few top-ranked concepts from the set (H-G) (the concepts that are present in H but not in G) ranked according to $R_{C|E}(t)$, E(C) contains the few top-ranked concepts from the set G∩H (the concepts that are present in both G and H) ranked according to $R_{E|C}(t)$, and C(E) contains the few top-ranked concepts from the set G∩H (the concepts that are present in both G and H) ranked according to $R_{C|E}(t)$.

Also, let t be a term (word or phrase).

t' be the complement of term t.

n(t) be the number of documents in N and M containing t.

n(S) be the number of documents in set S (S is either N or M).

n(S, t)=number of documents in set S and containing t.

$n(S_1, S_2)$=number of documents in any two sets $S_1$ and $S_2$.

In the Aposteriori Probability Ranking (PoP), the rank is given by $$R^{PoP}_{E|C}(t)=Pr(N|t)-Pr(M|t)$$

where Pr(S|t)=n(S,t)/n(t).

In case of Prior Probability Ranking (PrP), the rank is calculated as $$R^{PrP}_{E|C}(t)=Pr(t|N)-Pr(t|M)$$

where Pr(t|S)=n(S,t)/n(S).

Mutual Information Ranking (MI) can also be used to calculate the rank. This algorithm is based on the mutual information criterion between t and N. The rank is given by $$R^{MI}_{E|C}(t)=\ln(Pr(t|N)/Pr(t))$$

and is estimated by using $$R^{MI}_{E|C}(t)=\ln((n(n,t)*n(N,M))/(n(N)*n(t))).$$

A weakness of MI ranking is that for terms with equal conditional probabilities (Pr(t|N)=Pr(t|M)), rare terms will have a higher rank than common terms. Therefore, the ranks are not comparable across terms with widely differing frequencies.

One may also use $\chi^2$ Ranking (CHI) algorithm for ranking the concepts. This algorithm measures the lack of independence between t and N and can be compared to the $\chi^2$ distribution with one degree of freedom to judge extremeness. The ranking function is defined as:

$$R^{CHI}_{E|C}(t)=(n(N,M)*(n(N,t)*n(M,t')-n(N,t')*n(M,t))^2/(n(N)*n(M)*(n(t)*n(t')))$$

While using Fisher's Discriminant Ranking (FD), two variants of FD can be used. Let the two variations of FD be FD1 and FD2. One may refer to the following literature for details about the Fisher's Discriminant based feature selection algorithm: Soumen Chakrabarti, Byron Dom, Rakesh Agrawal, and Prabhakar Raghavan, "Using taxonomy, discriminants, and signatures for navigating in text databases," in Proceedings of 23rd International Conference on Very Large Data Bases, 1997. Let δ(d, t)=1, if t belongs to d, and δ(d, t)=0, otherwise. Here d denotes a document. Assuming that E and C represent two classes, we can compute intra class variance of document frequency as:

$$icv(t,S)=\Sigma_S(1/n(S))(\delta(d,t)-Pr(t|S))^2$$

and inter class variance of document frequency between N and M is defined as:

$$ICV(t, N, M)=(Pr(t|N)-Pr(t|M))^2$$

Then one of the ranking functions is defined as:

$$R^{FD1}_{E|C}(t)=icv(t,N)-icv(t,M),$$

and the other as:

$$R^{FD2}_{E|C}(t)=ICV(t,N,M)-icv(t,M).$$

It may be noted that the definitions of all the above ranking functions is based on the document frequencies. The functions can also be similarly defined based on term frequencies instead of document frequencies. Experiments have been conducted with both variants and it has been found that the term-frequency ranking functions perform better than document frequency ones.

Hardware and Software Implementation

The system, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

Figure 7:
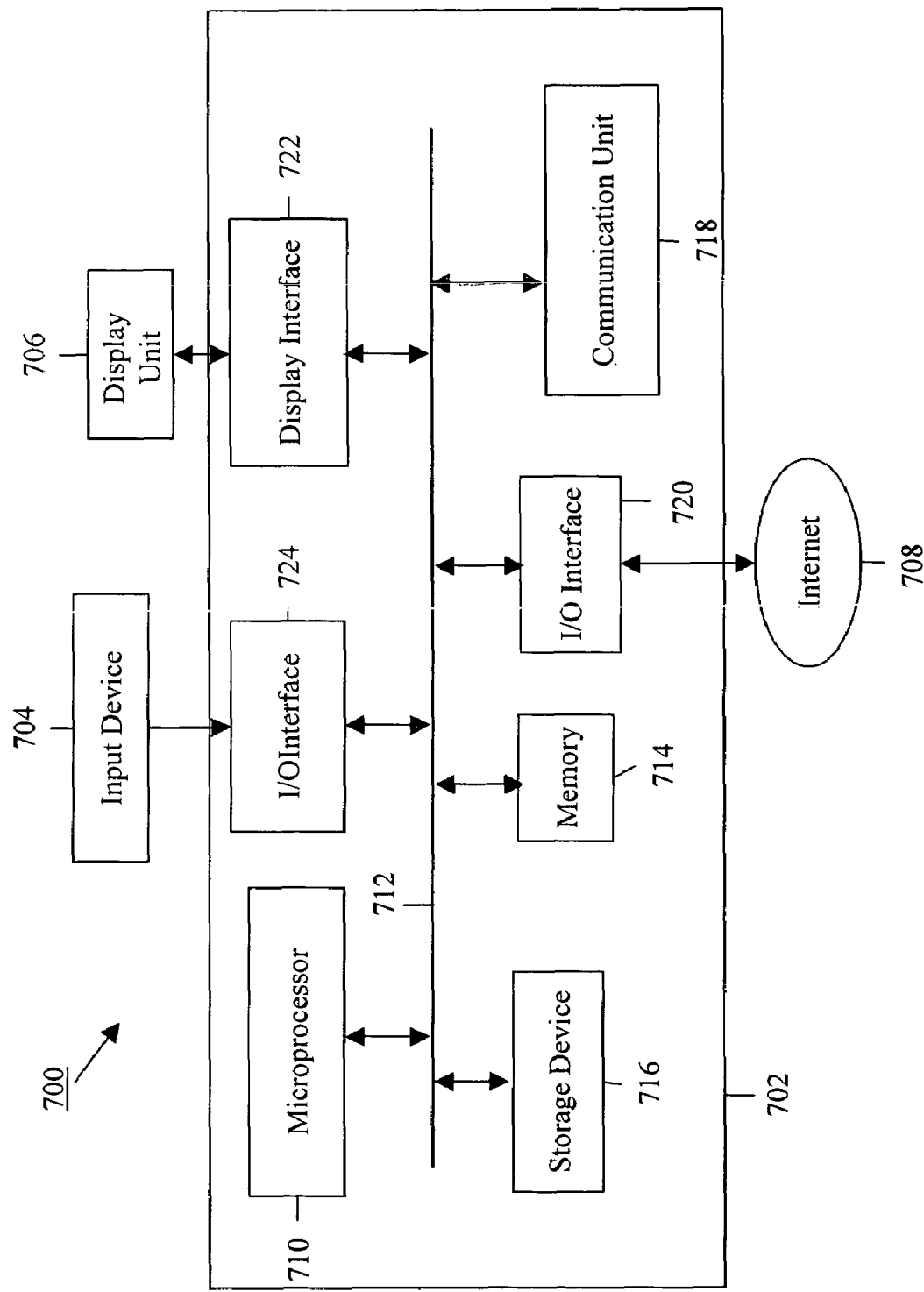
FIG. 7 illustrates a computer system for implementing the present invention.

One such computer system has been illustrated in FIG. 7. The computer system 700 comprises a computer 702, an input device 704, a display unit 706 and the Internet 708. Computer 702 comprises a microprocessor 710. Microprocessor 710 is connected to a communication bus 712. Computer 702 also includes a memory 714. Memory 714 may include Random Access Memory (RAM) and Read Only Memory (ROM). Computer 702 further comprises storage device 716. It can be a hard disk drive or a removable storage drive such as a floppy disk drive, optical disk drive and the like. Storage device 716 can also be other similar means for loading computer programs or other instructions into the computer system. The computer system also includes a communication unit 718. Communication unit 718 allows the computer to connect to other databases and Internet 708 through an I/O interface 720. Communication unit 718 allows the transfer as well as reception of data from other databases. Communication unit 718 may include a modem, an Ethernet card or any similar device, which enables the computer system to connect to databases and networks such as LAN, MAN, WAN and the Internet. The computer system also includes a display interface 722 for connecting to display unit 706. The computer system facilitates inputs from a user through input device 704, accessible to the system through I/O interface 724.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

A person skilled in the art can appreciate that the various processing machines and/or storage elements may not be physically located in the same geographical location. The processing machines and/or storage elements may be located in geographically distinct locations and connected to each other to enable communication. Various communication technologies may be used to enable communication between the processing machines and/or storage elements. Such technologies include session of the processing machines and/or storage elements, in the form of a network. The network can be an intranet, an extranet, the Internet or any client server models that enable communication. Such communication technologies may use various protocols such as TCP/IP, UDP, ATM or OSI.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method of profiling an entity, said method comprising:
    retrieving information from at least one information source using said entity as a search criteria;
    clustering the retrieved information to identify contexts related to said entity, wherein said contexts are represented by a set of documents;
    retrieving information corresponding to each identified context from at least one information source;
    selecting features from the information retrieved at both of the retrieving steps to identify concepts associated with said entity within each identified context;
    structuring the identified concepts within said each identified context by classifying said identified concepts into exactly four classification sets;
    ranking said identified concepts within each set; and
    profiling said entity by presenting the top ranked concepts within each set to a user,
    wherein the contexts are identified by finding a set of the words or phases that occur frequently with said entity and that mutually do not appear together in documents in the information source, and
    wherein said contexts are identified by finding prominent nodes, that comprise said entity, in an ontology or a taxonomy.

2. The method of claim 1, wherein said contexts are identified by using at least one of synonyms, hypernyms, hyponyms, and meronyms of said entity found in a thesaurus.

3. The method of claim 1, wherein said four classification sets comprise:
    a set of concepts that are exclusive to said entity and unrelated to said identified context;
    a set of concepts that are common to both said entity and said identified context and more frequently associated with said entity;
    a set of concepts that are common to both said entity and said identified context and more frequently associated with said identified context; and
    a set of concepts that are exclusive to said identified context and unrelated to said entity.

4. A method of profiling an entity, said method comprising:
    identifying contexts associated with said entity, wherein said contexts are represented by a set of documents;
    retrieving information corresponding to each identified context from at least one information source;
    selecting features from the retrieved information to identify concepts associated with said entity within said each identified context;
    structuring the identified concepts within said each identified context by classifying said identified concepts into exactly four classification sets;
    ranking said identified concepts within each set; and
    profiling said entity by presenting the top ranked concepts within each set to a user,
    wherein the contexts are identified by finding a set of the words or phrases that occur frequently with said entity and that mutually do not appear together in documents in the information source, and
    wherein said contexts are identified by using at least one of synonyms, hypernyms, hyponyms, and meronyms of said entity found in a thesaurus.

5. The method of claim 4, said contexts are identified by finding prominent nodes, that comprise said entity, in an ontology or a taxonomy.

6. The method of claim 4, wherein said four classification sets comprise:
    a set of concepts that are exclusive to said entity and unrelated to said identified context;
    a set of concepts that are common to both said entity and said identified context and more frequently associated with said entity;
    a set of concepts that are common to both said entity and said identified context and more frequently associated with said identified context; and
    a set of concepts that are exclusive to said identified context and unrelated to said entity.

7. A program storage device readable by computer, tangibly embodying a program of instructions executable by the computer to perform a method of profiling an entity, said method comprising:
    retrieving information from at least one information source using said entity as a search criteria;

clustering the retrieved information to identify contexts related to said entity, wherein said contexts are represented by a set of documents;
retrieving information corresponding to each identified context from at least one information source;
selecting features front the information retrieved at both of the retrieving steps to identify concepts associated with said entity within each identified context;
structuring the identified concepts within said each identified context by classifying said identified concepts into exactly four classification sets;
ranking said identified concepts within each set; and
profiling said entity by presenting the top ranked concepts within each set to a user,
wherein the contexts are identified by finding a set of the words or phrases that occur frequently with said entity and that mutually do not appear together in documents in the information source, and
wherein said contexts are identified by finding prominent nodes, that comprise said entity, in an ontology or a taxonomy.

8. The program storage device of claim 7, wherein said contexts are identified by using at least one of synonyms, hypernyms, hyponyms, and meronyms of said entity found in a thesaurus.

9. The program storage device of claim 7, wherein in said method, said four classification sets comprise:
a set of concepts that are exclusive to said entity and unrelated to said identified context;
a set of concepts that are common to both said entity and said identified context and more frequently associated with said entity;
a set of concepts that are common to both said entity and said identified context and more frequently associated with said identified context; and
a set of concepts that are exclusive to said identified context and unrelated to said entity.

10. A system for profiling an entity, said system comprising:
means for retrieving information from at least one information source using said entity as a search criteria;
means for clustering the retrieved information into entity-context pairs in order to identify contexts related to said entity, wherein said contexts are represented by a set of documents;
means for retrieving information corresponding to each identified context from at least one information source;
means for selecting features from the retrieved information in order to identity concepts associated with said entity within said each identified context;
means for structuring the identified concepts within said each identified context by classifying said identified concepts into exactly four classification sets;
means for ranking said identified concepts within each set; and
means for profiling said entity by presenting the top ranked concepts within each set to a user,
wherein the contexts are identified by finding a set of the words or phrases that occur frequently with said entity and that mutually do not appear together in documents in the information source, and
wherein said contexts are identified by finding prominent nodes, that comprise said entity, in an ontology or a taxonomy.

11. The system of claim 10, wherein said means for structuring the identified concepts within said each identified context comprises:
a classifier operable for classifying said identified concepts into sets with respect to each entity-context pair; and
a component operable for ranking said identified concepts within each set.

12. The system of claim 10, wherein said four classification sets comprise:
a set of concepts that are exclusive to said entity and unrelated to said identified context;
a set of concepts that are common to both said entity and said identified context and more frequently associated with said entity;
a set of concepts that are common to both said entity and said identified context and more frequently associated with said identified context; and
a set of concepts that are exclusive to said identified context and unrelated to said entity.

* * * * *